United States Patent
Koomen

[11] Patent Number: 6,016,368
[45] Date of Patent: Jan. 18, 2000

[54] APPARATUS FOR DERIVING POSITIONAL INFORMATION ON BOX-SHAPED OBJECTS, AND METHOD IN WHICH APPARATUS IS USED

[75] Inventor: Jacob Koomen, Castricum, Netherlands

[73] Assignee: Koninklijke KPN N.V., Groningen, Netherlands

[21] Appl. No.: 09/022,762

[22] Filed: Feb. 12, 1998

[30] Foreign Application Priority Data

Apr. 2, 1997 [NL] Netherlands ............................ 1005705

[51] Int. Cl.[7] ....................................................... G06K 9/00
[52] U.S. Cl. ........................................... 382/291; 382/143
[58] Field of Search ................................... 382/291, 141, 382/143; 348/86, 94, 95, 89, 91, 92

[56] References Cited

U.S. PATENT DOCUMENTS

| | | | |
|---|---|---|---|
| 4,872,024 | 10/1989 | Nagai et al. ............................ | 382/143 |
| 5,128,753 | 7/1992 | Lemelson ................................. | 382/141 |
| 5,208,870 | 5/1993 | Ennis ....................................... | 382/143 |
| 5,446,549 | 8/1995 | Mazumder et al. ..................... | 382/141 |

FOREIGN PATENT DOCUMENTS

| | | |
|---|---|---|
| 0 385 625 | 9/1990 | European Pat. Off. . |
| 41 29 829 A1 | 3/1993 | Germany . |
| 41 31 365 A1 | 4/1993 | Germany . |
| 6-345270 | 4/1995 | Japan . |

*Primary Examiner*—Yon J. Couso
*Attorney, Agent, or Firm*—Frishauf, Holtz, Goodman, Langer & Chick, P.C.

[57] ABSTRACT

Apparatus and method for distinguishing horizontal and vertical surfaces of box-shaped objects, particularly parcels, which objects are stacked in an orderly stack in which the lateral surfaces are substantially parallel. The influence of variations in the reflection coefficient over the surfaces of the objects is substantially eliminated. The apparatus and the method make it possible to determine which parcel in the stack may be picked up by a mechanical grab engaging with a front and the top of the parcel.

15 Claims, 1 Drawing Sheet

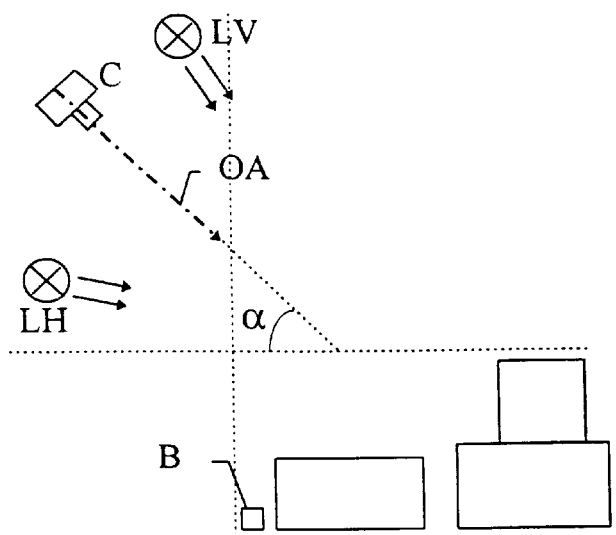
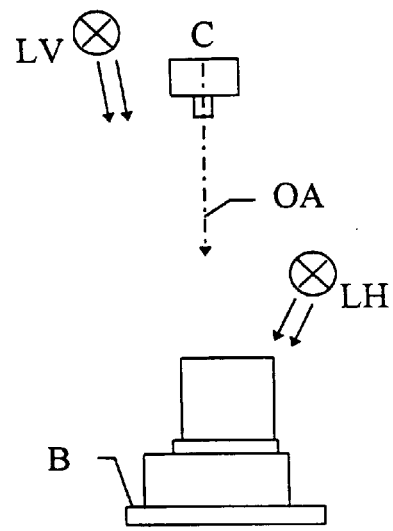
FIG. 1A
FIG. 1B
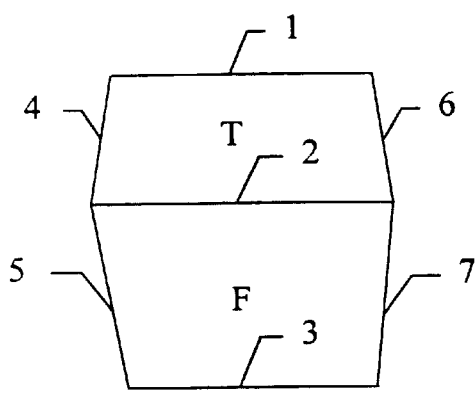
FIG. 2
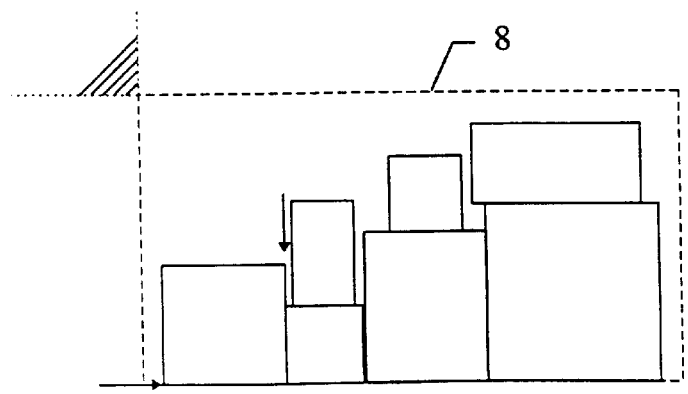
FIG. 3

APPARATUS FOR DERIVING POSITIONAL INFORMATION ON BOX-SHAPED OBJECTS, AND METHOD IN WHICH APPARATUS IS USED

BACKGROUND OF THE INVENTION

The invention relates to an apparatus for deriving information on the spatial position of box-shaped objects from image information on said objects. Furthermore, the invention relates to a method in which the apparatus is used.

During the transport and the distribution of goods, in many cases interim storage of the goods takes place. This occurs, inter alia, when parcels are being shipped, e.g., by a postal service. For the purpose of said interim storage, parcels—as a rule box-shaped objects—are accommodated in ordered stacks, such as cage-shaped containers (roll containers) or on pallets. Eventually, parcels must also be withdrawn from the stacks in order to be able to distribute them among several destinations. When this is done manually, such is a labour-intensive and physically demanding process. Options are therefore being sought to have said process carried out by robots. For this purpose, said robots should dispose of information on the spatial position of parcels in the stack in question. The stack is ordered in the sense that the containment surfaces—the lateral surfaces, top and bottom—of the parcels are substantially horizontal and vertical rectangular surfaces, and that the edges of said surfaces run substantially parallel. Deriving spatial information on the parcels from images of the stack then boils down to distinguishing horizontal and vertical surfaces in the images and determining the transitions between said surfaces—the edges of the surfaces. A problem here is the fact that the reflection coefficient, representing the light-reflecting capacity, may vary considerably over one surface of a certain parcel. In most cases, said variation then is the result of the presence of inscriptions, labels or ornaments, but may also be caused by strongly reflecting areas, e.g., in places where adhesive tape has been applied. It is therefore not sufficient to detect abrupt light-intensity transitions in an image taken of a stack of parcels.

SUMMARY OF THE INVENTION

The apparatus according to the invention enables a distinction to be made between horizontal and vertical surfaces of box-shaped objects, particularly parcels, in a stack, as well as to determine the transitions between such surfaces, with the influence of variations in the reflection coefficient being substantially eliminated. For this purpose, an apparatus according to the invention comprises:

a camera in a first position obliquely above and in front of the stack, such that the optical axis of the camera is located in a vertical plane which is substantially perpendicular to lateral surfaces of the objects which, seen from the camera, are front surfaces of the objects, the optical axis making a first angle $\alpha$ with the horizontal surface on which the stack rests;

a first light source in a second position, whose light is substantially bundled in a direction under a second angle with the horizontal surface on which the stack rests, said second angle being greater than $\alpha$;

a second light source in a third location, whose light is substantially bundled in a direction under a third angle with the horizontal surface on which the stack rests, said third angle being less than the second angle;

memory means for storing intensity values for pixels in images taken using the camera;

calculating means for performing mathematical operations on intensity values stored in the memory means.

Although hereinabove and hereinafter two distinct light sources, will be referred to in an apparatus according to the invention the first and second light sources may be formed by one and the same light source which may be shifted, at appropriate points in time, from the second to the third position, or in the reverse direction, or whose light beam is consecutively conducted in two different directions using mirrors.

According to a preferred embodiment of the invention, the camera is located in such a position that the optical axis makes an angle of approximately 45 degrees with the horizontal surface on which the stack rests, the light from the first light source is bundled in a direction under an angle of 60 to 90 degrees with the horizontal plane, and the light from the second light source is bundled in a direction under an angle of 0 to 30 degrees with the horizontal plane. In this connection, the camera and the two light sources are located in front of and above the stack.

The method according to the invention, using the apparatus according to the invention, comprises the following steps:

taking a first image, using the camera, of the stack of objects, the stack being illuminated by the first or by the second light source, as well as storing, in the memory means, intensity values for the pixels in the first image taken;

taking a second image, using the camera, of the stack of objects, the stack being illuminated by the second or by the first light source, as well as storing, in the memory means, intensity values for the pixels in the second image taken;

comparing the intensity value for a pixel in the first image and the intensity value for a pixel in the second image.

In a preferred embodiment of the method according to the invention, the method additionally comprises the following steps:

determining the ratio between the intensity value for a pixel in the first image and the intensity value for the corresponding pixel in the second image;

performing a mathematical operation on the ratios determined for all pixels in the first and second images;

based on the results of the mathematical operations, storing in the memory means a matrix of pixels for a virtual third image, there being assigned, to a certain pixel of the third image, an intensity value which is representative of the result of the mathematical operation on the intensity ratio for said pixels in the first and second images which correspond to the pixel in the third image.

In a further preferred embodiment of the method according to the invention, the method further comprises the following steps:

determining, in the third image, lines which form the boundaries between first and second areas, in which connection it applies that, within the first areas, the intensity for the pixels belonging to said first areas lies on or about a first value and that, within the second areas, the intensity for the pixels belonging to said second areas lies on or about a second value, the first areas corresponding to substantially horizontal surfaces of the objects and the second areas to substantially vertical surfaces of the objects;

starting from a first line, which forms the boundary between a horizontal and a vertical surface, the horizontal surface being located in the third image above the vertical surface, determining whether the vertical surface has a substantially rectangular shape, limited by the first line and three uninterrupted lines therebelow.

BRIEF DESCRIPTION OF THE DRAWINGS

The invention will be further explained by means of the description of an exemplary embodiment, reference being made to a drawing in which:

FIG. 1A provides a side view of an apparatus according to the invention;

FIG. 1B provides a view of an apparatus according to the invention in a direction perpendicular to that of FIG. 1A;

FIG. 2 gives an image of the contours of a parcel as this may be observed from the camera position;

FIG. 3 provides a side view of a possible stacking of objects.

DESCRIPTION OF AN EXEMPLARY EMBODIMENT

The apparatus according to the invention may be part of, e.g., an apparatus for emptying a cage-shaped container for the interim storage of goods. In particular, this may involve emptying roll containers with parcels, in order to further distribute said parcels. In the exemplary embodiment to be described, there are assumed grab means, for picking up a parcel, which on the one hand engage with the bottom edge of a vertical surface which, seen from the camera position, may be called the front of the parcel, on the other hand with the rear edge of the top of the parcel. In order to be capable of picking up a parcel, it is then necessary, therefore, to detect the bottom edge of the front and the rear edge of the top of a parcel. Of course it applies that, when use is made of grab means engaging with other points, e.g., of a vacuum grab which approaches a parcel from above, the positional information derived by the apparatus should be utilised in a manner adjusted thereto.

Of course, it only makes sense to attempt to pick up a parcel to which the grab means have unobstructed access, without another parcel being located in the path of the grab means. It should therefore also be determined whether a parcel of which said edges have been detected, is accessible, "grabbable".

The figures FIG. 1A and FIG. 1B provide a side view and a view perpendicular thereto of the apparatus, respectively, according to a preferred embodiment of the invention. In FIG. 1A and FIG. 1B, (C) is a black-and-white camera with which images can be taken of a stack of parcels. In order not to clutter up the image, the stack in FIG. 1A and FIG. 1B, consists of three parcels only. One light source, (LV) in the figures FIG. 1A and FIG. 1B, is located substantially straight above the stack, the other light source (LH) substantially straight in front of the stack, seen from a position with respect to the stack near the camera. In a preferred arrangement, the optical axis of the camera makes an angle of approximately 45 degrees with the horizontal plane; the light beam, emitted by light source (LV), makes an angle of approximately 63 degrees with the horizontal plane. For the angle which the light beam of light source (LH) makes with the horizontal plane, 25 degrees were chosen in the preferred arrangement. To both light beams it applies that they are not oriented parallel to the optical axis of the camera, as is shown in FIG. 1B. In other words: the light sources (LV) and (LH) are located at some distance on either side of a vertical plane intersecting with the optical axis of the camera.

Moreover, the light sources should each be located at a sufficient distance from the camera, in order to render the contrast between an image taken under illumination by the one light source and an image taken under illumination by the other light source large enough. In this description, there are always mentioned two light sources, but use might also be made of one single light source which is alternatingly placed on the one and then on the other one of the preferred positions. In the exemplary embodiment described, the angle which the light beam emitted by (LH) makes with the horizontal plane is further chosen to have a value less than that of the angle which the optical axis of the camera makes with the horizontal plane. For making a distinction between horizontal and vertical planes, however, it is essential only that the angular value for (LH) is less than that for (LV).

The arrangement according to the figures FIG. 1A and FIG. 1B makes it possible:

a) simultaneously to take both an image of the top and of the front of a parcel using the camera;

b) to take an image of the stack, while it is illuminated by the one light source and subsequently an image with illumination by the other light source;

c) to highlight vertical gaps between parcels.

The properties a), b) and c) of the apparatus are required, on the one hand, for the grab means to be capable of picking up a parcel in the manner sketched above. On the other hand, they make it possible to substantially eliminate interfering details on the top or front of the parcel by suitably combining images which have been taken one after the other with alternately switched-on light sources.

In a further preferred embodiment of the apparatus, the light sources (LV) and (LH) are formed by flash bulbs. This benefits the speed with which the image is formed, while the luminous power is high in comparison to the ambient light, so that in this respect the apparatus does not depend on environmental influences.

FIG. 2 shows an image of the contours of a parcel as this may be observed from the camera position. Due to distortion in perspective, several lines which in reality run parallel are not parallel in the image. Here, it concerns the lines (4) and (6), which in reality run horizontally, and the lines (5) and (7), which in reality run vertically. In FIG. 2, (T) is the top of the parcel and (F) the front. For determining the places where grab means might engage with said parcel in the manner referred to in the introduction, the positions of the edges (1) and (3) should be determined.

FIG. 3 provides a side view of a possible stacking of parcels. Camera and light sources are not shown in this figure, but they should be deemed to be located, as in FIG. 1A, in an area to the left of and above the stack; in FIG. 3, the intersection of this area with the surface of the paper is indicated by hatching. In the event of the shown stacking of parcels, the presence of the left parcel results in that the remaining parcels are not accessible to the grab means. Only said left parcel is accessible; the places for the grab means to engage with have been designated by arrows in FIG. 3. The broken lines in the figure indicate the boundaries of the area (8) within which there may be parcels. Said area (8) is an imaginary parallelepiped; of course, it also has a dimension perpendicular to the paper.

In the method according to the invention, the apparatus shown in figures FIG. 1A and FIG. 1B is used in the following manner:

At a first point in time, a first image is taken by camera (C) under illumination of the stack of parcels by either light source; in the description following below, it is assumed that the first image is taken under illumination by light source LV, with a substantially vertically-oriented light beam. The image is digitally stored in memory means, the light intensity $I_v(x,y)$ for each pixel (x,y) in a preferred embodiment being capable of having a value of 0 to 255 inclusive; encoding is therefore effected with 8 bits per pixel. The value 0 corresponds to black, the value 255 to maximum bright.

At a following, second point in time, a second image is taken under illumination of the stack by the other light source, i.e., in the case described LH, with a substantially horizontally-oriented light beam. Said second image, too, is digitally stored in memory means as intensity values $I_h(x,y)$, with the same encoding as the first image.

The first and second images are combined in the following manner. For each pair of pixels (x,y) in the first and second images, a comparison is made between the intensity value for a pixel $(x_i,y_j)$ in the first image, $I_v(x_i,y_j)$, and the intensity values for the corresponding pixel (at the same spot in the image) in the second image, $I_h(x_i,y_j)$. In order to be capable of distinguishing horizontal surfaces from vertical surfaces, it suffices to determine for which surfaces the intensity value upon illumination by LV is greater than upon illumination by LH. In other words: there is involved a horizontal surface at the location of $(x_i,y_j)$ if the following applies: $I_v(x_i,y_j) > I_h(x_i,y_j)$, at any rate up to a certain limit. If $I_v(x_i,y_j) >> I_h(x_i,y_j)$, there obviously is involved a shadow (on a vertical surface) upon illumination by LH.

Having said this, for the reasoning shown above it was assumed that the light sources LV and LH have the same intensity. In this connection, the use of one single light source which is alternately placed in the position of LV and that of LH, would offer advantages. Furthermore, it is to be recommended to apply a standardisation to the intensity values in an image, by determining the intensity values at the location of a small beam, designated by (B) in FIG. 1A and FIG. 1B and having a known orientation. From said known orientation, it then follows what should be the intensity ratio $I_v/I_h$ for a horizontal and a vertical surface, respectively.

To compare $Iv$ and $I_h$, it is preferable to determine the ratio $I_v/I_h$. It may be assumed that, in the event of parcels as these are located in the apparatus, the reflection coefficient does not depend on the angle under which light strikes a surface of a parcel. In other words: regarding the surfaces of parcels, it may be assumed that they are generally Lambertian. Upon determination of the ratio $I_v/I_h$, then, the same reflection coefficient will figure in the numerator and the denominator of the fraction, which results in a value for the ratio $I_v/I_h$ which does not depend on the reflection coefficient. This does not hold for portions of parcel surfaces only which do not produce Lambertian dispersion, as is the case when there is present strongly-reflecting adhesive.

In order to obtain a better distribution of intensity-ratio values over a value range, in a preferred embodiment of the method according to the invention there is carried out a mathematical operation on the values for $I_v/I_h$. For this purpose, the arctan function may advantageously be used. The step in question in the method then implies: the determination, for each pixel (x,y), of the value for arctan $(I_v(x,y)/I_h(x,y))$. By reference to this, there is assigned, to the corresponding pixel (again at the same location in the image), an intensity value in the resulting third image.

The intensity values for the third image again are (substantially) independent from values for the reflection coefficient for the several surfaces which are visible to the camera.

For determining the points of application for grab means on surfaces of a parcel accessible to said grab means, it is not sufficient to determine the position of the horizontal and vertical surfaces in the image obtained. Particularly with a view to determining whether a parcel is accessible or not, the edges and possible interruptions therein should also be determined. For this purpose, a number of operations to be described below are carried out on the constructed third image—actually, a matrix of intensity values of pixels in a virtual image.

In the matrix of intensity values, the intensity values of pixels are taken into consideration consecutively from left to right and in each column from top to bottom. For each pixel in the third image, it may be determined whether it belongs to a horizontal or a vertical surface. In the part of the description following below, a pixel belonging to a horizontal surface will be designated by H and a pixel belonging to a vertical surface by V. Per column, all "HV transitions" are determined, i.e., all locations in the matrix where there is an H above a V. This way, the transitions between tops (T) and fronts (F) of parcels are determined—the "T/F edges". If in a column having co-ordinate $x_i$ there is found an HV transition, it is verified whether in the column to the left thereof, having co-ordinate $x_{i-1}$, there is an HV transition which is a transition between the same surfaces as those considered in column $x_i$. For this purpose, there may be proceeded in the manner described below.

Suppose an HV transition is observed in column $x_i$, with pixel $(x_i,y_j)$ belonging to the category H (simply: $(x_i,y_j)$ is H and $(x_i,y_{j+1})$ is V). In the "ideal" case, which involves a horizontal edge between a horizontal and a vertical surface, $(x_{i-1},y_j)$ will be H and $(x_{i-1},y_{j+1})$ will be V. In other words: the limiting point $(x_i,y_j)$ has a left neighbour in column $x_{i-1}$, also having an HV transition, at the same height in the matrix. The HV transitions in column $x_{i-1}$ and column $x_i$ then obviously belong to the same transition line between a horizontal (top) surface and a vertical (front) surface. The limiting points in question are stored in a list—an "edge list" —for the transition line in question, or the limiting point in column $x_i$ is added to an existing edge list, as the case may be. Instead of said "ideal" case, there may still be other cases, particularly when the edge between horizontal and vertical surface is not horizontal. In total, there may be distinguished four situations. In the first thereof, a left neighbour of $(x_i,y_j)$ is located above the row $y_j$ in the matrix, in a second there is a left neighbour at the same height in the matrix, in a third there is a left neighbour below the row $y_j$ and in the fourth situation there is no left neighbour. In order to determine whether one of the first three situations arises, there may be proceeded as follows. Starting from the HV transition observed in column $x_i$ ($(x_i,y_j)$ is H and $(x_i,y_{j+1})$ is V), it is first verified whether in the column to the left thereof there is also present an HV transition at the same height: $(x_{i-1},y_j)$ then is H and $(x_{i-1},y_{j+1})$ is V. If such is not the case, it is downward verified in the matrix whether against a V in column $x_i$ there is an H in column $x_{i-1}$. As long as such is the case, the matrix is further run through downward. If, in doing so, the bottom row of the matrix is reached, the conclusion is justified that there is no left neighbour below the row $y_j$, and a possible left neighbour above the row $y_j$ is looked for. If, however, when running downward through the matrix, there is reached a row $y_{j+k}$ for which $(x_{i-1},y_{j+k})$ is V, the conclusion is that there has been found a left neighbour below the row $y_j$, and the limiting point in column $x_i$ is added to the edge list for the transition line in which the left neighbour was included, or the limiting points in question are stored in a new edge list, as the case may be. A left neighbour above the row $y_j$ is found in a similar manner by, starting from the "original" HV transition in column $x_i$, running upward through the matrix and, in doing so, determining whether against an H in column $x_i$ there is located a V in column $x_{i-1}$. If, in doing so, the top row, $y_1$, is reached, it may be assumed that above the row $y_j$ there is located no left neighbour. If thus it is found that none of the first three situations arises, the conclusion is drawn that there is no left neighbour of the "original" HV transition in column $x_i$, and for the time being said HV transition is not included in an edge list. In this manner, it is prevented that an isolated transition originating from, e.g., an image breakdown, is taken into consideration during the continuation of the process. If, however, when running upward through the matrix, there is reached a row $y_{j-m}$ for which $(x_{i-1}, y_{j-m})$ is H, it is concluded that a left neighbour above the row $y_j$ has been found, and the limiting point in column $x_i$ is added to the edge list for the transition line in which the left neighbour had been included, or the limiting points in question are stored in a new edge list, as the case may be.

In order to refine the process described above, and to prevent unnecessary activities in the remainder of the process, there is taken no decision on a starting point of a new transition line in the event that the pixels in question belong to the background. For this purpose, there is made use of a threshold value for the intensity values of the pixels in the images started from.

Once the investigation into left neighbours of all HV transitions in column $x_i$ is completed, the search is continued in the column $x_{i+1}$ located to the right thereof. In this manner, all columns of the matrix are consecutively processed in turn, resulting in a set of edge lists, together representing the edges between horizontal and vertical surfaces.

Once the edges between horizontal and vertical surfaces, the "T/F edges", have been found, it is best to verify whether these actually correspond to the positions of the parcels, and therefore to validate the results of the method adopted. There may occur two types of errors:

I) The edge line found is observed as a result of the presence of several parcels, and therefore not of one parcel.

II) The edge line found is not the complete (visible) edge of the parcel in question.

Re I)

This situation arises when two (or more) parcels are stacked one beside the other. When the edge line in question is followed, it must be determined whether it involves, e.g., a (more or less vertical) separation line between two parcels. If this is present, the edge line found must be broken down into two separate lines.

Re II)

A complete "T/F edge" is limited by two (more or less vertical) edges: the left and right edges of the front and the top of the parcel in question. If these are not there, the "T/F edge" found is not complete, probably since another parcel is stacked on top of it. The edge line found must not further be taken into consideration.

If the edge lines found are validated, it is investigated whether a front of a parcel is located under said edge lines. If there are no parcels present in front of the front in question, said surface of the parcel will substantially be a rectangle. Substantially, since there occurs distortion in the image through the camera. Nonetheless, a parcel front is characterised by a limitation through four straight edges. If the limitation is different, the parcel in question should further be left out of consideration: it is not accessible to the grab means. There need therefore only be looked for a (substantially) rectangular surface, of which the "T/F edge" forms the top limitation. Looking for the front of a parcel then boils down to looking for the remaining three edges of the front. In this connection, it may suffice to process image information in a relatively small part of the image, below the "T/F edge". The three edges to be found in the event of their belonging to a parcel front meet several conditions:

The bottom edge of the front is (substantially) parallel to the "T/F edge" and should have substantially the same length. The column in which the bottom edge starts and the one in which the bottom edge terminates, approximately correspond to the respective columns for the "T/F edge".

The left edge is (substantially) perpendicular to the "T/F edge". The top point of the left edge coincides with the beginning of the "T/F edge".

The right edge is (substantially) perpendicular to the "T/F edge". The top point of the right edge coincides with the end of the "T/F edge".

Once the edges of the front of a parcel have been found, there obviously is a rectangular area having F pixels (pixels belonging to a front F) present in the image, under the "T/F edge". This does not necessarily mean that the front was found in its entirety: other parcels in the stack may obstruct the view on a portion of the front. The accessibility of the front must still be confirmed at a later stage.

In a similar manner as the one described above, the top of the parcel, to which the "T/F edge" found belongs, can be traced. Looking for the top, however, need not occur if no front has been found. In this case, the parcel in question is not accessible to the grab means anyway.

After determining the position in the image of the front and the top of a parcel, it must still be determined whether the grab means are capable of grabbing the parcel, whether the parcel is accessible to the grab means. For this purpose, an answer should be found to several questions:

1. Is the rear edge found of the top really the rear edge of the top of the parcel, or is the rear edge found formed by an edge of a parcel which rests on the parcel in question?

2. Is the bottom edge found of the front really the bottom edge of the front of the parcel, or is finding the bottom edge the result of covering by another parcel (a parcel which is located in front of the parcel in question, or which casts a shadow on said considered parcel)?

3. Can one of the grab means be positioned in front of the parcel in question, at the same height as the bottom edge, and can this grab means then move horizontally in the direction of the parcel, without damaging other parcels?

4. Can the other grab means move vertically downward and engage with the rear edge of the top, for supporting purposes?

Re 1.

The top visible in the image is limited by the rear edge found. Behind said top, there is located another area. This may consist of background, shadow, or parcel surface (either the front or the top).

Combinations are also possible, e.g., when the parcel in question is wide and there are visible: the background at the left side of the rear edge, a front of another parcel in the middle of the rear, and a shadow cast by LH to the right of the rear edge.

Depending on what proves to be located behind the rear edge found, conclusions may be drawn on the accessibility of the back of the parcel:

1a) The area behind the rear edge belongs to the background.

This implies that in that point the rear edge is not in touch with other objects and the rear edge there also corresponds to the real rear edge of the parcel. Since it is known from the preceding step in the process that the rear edge found extends over the entire width of the parcel, it may be concluded that the entire visible rear edge corresponds to the actual rear edge of the parcel and is not the result of covering by another parcel.

1b) The area behind the rear edge is formed by a shadow cast by LH.

If the top of the parcel in question casts a shadow when the (substantially) horizontally-oriented light source is switched on, this means that there is a gap located behind the parcel. Since it is known that the rear edge found extends over the entire width of the parcel, the conclusion here also is that the entire visible rear edge corresponds to the actual rear edge of the parcel.

1c) The area behind the rear edge is formed by a shadow cast by LV.

At the location of the shadow cast by LV, there must be located another parcel above the shadow area. From the information available, no conclusion can be drawn on the actual, physically present, rear edge of the parcel in question. It is recommended to first consider the parcels above the parcel in question; the parcel which casts the vertical shadow will then be removed from the stack. As a result, the uncertainty is then eliminated.

1d) The area behind the rear edge is formed by a front.

In this case, there are two options. In the first case, the parcel in question is located in front of another parcel; in the other case, another parcel lies (partially) on top of the parcel in question. If the two parcels are of exactly the same width, no distinction can be made between the two cases. The solution to this problem then is a question of "trial and error". By the way: if a parcel lies on top of the parcel in question, which is narrower than the parcel in question, said situation has already been recognised when determining the position of the rear edge: in this case, said rear edge is not uninterrupted in the image.

1e) The area behind the rear edge is a top.

This provides no ground for conclusions on the coincidence of the rear edge found and the actual, physically present, rear edge of the parcel in question. This stems from the fact that it often occurs that, in the middle of the top of the parcel, flaps are glued together and a line runs across the entire width of the parcel there. Said line is easily interpreted as a "rear edge" and behind said "rear edge" there is then located a top, namely, the other half of the top of the parcel in question, unless such gluing-together results in an area having direct reflection, leading to conclusion 1f.

1f) The area behind the rear edge is one having direct reflection.

It is very unlikely that a large area in the image is formed by pixels having "direct-reflection" properties. After all, this occurs only if the reflection takes place in the direction of the camera. In practice, said situation has not yet arisen.

In this manner, it may be attempted to validate the rear edge found. In a number of cases, a positive conclusion is possible; in the remaining situations, no conclusion is possible. After processing the image information in the described manner, and after the analysis of the front and of the accessibility still to be described, there is assigned, to the control apparatus of the grab means, the parcel for which the greatest number of positive conclusions may be drawn. Parcels for which negative conclusions have been drawn are not assigned.

Re 2.

In a similar manner as described under "Re 1.", the bottom edge of the front of the parcel in question may be validated. Once again, several situations may arise:

2a) The area below the bottom edge belongs to the background.

This implies that the parcel in question does not rest on other parcels and that the bottom edge found is the actual, physically present, bottom edge of the parcel.

2b) The area below the bottom edge is formed by a shadow cast by LH.

This means that the (substantially) horizontally-oriented light source casts a shadow on the front of the parcel in question. That is why the bottom edge found corresponds to the limitation of the shadow and not to the actual, physically present, bottom edge. This also implies that the front of the parcel in question is not accessible to the horizontally-moving grab means.

2c) The area below the bottom edge is formed by a shadow cast by LV.

In this case, the parcel in question is (partially) not supported by another parcel and the (substantially) vertically-oriented light source casts a shadow below the parcel. The bottom edge found corresponds to the actual, physically present, bottom edge.

2d) The area below the bottom edge is formed by a front.

This occurs relatively often: the parcels may be stacked one upon the other in such a manner that the fronts are located (substantially) in one plane. A conclusion is not possible.

2e) The area below the bottom edge is a top.

This occurs when another parcel is located in front of/below the parcel in question. Just as in the event of situation 1d), no final conclusion is possible.

2f) The area below the bottom edge is one having direct reflection.

The same applies to this as to situation 1f).

Re 3.

For determining the accessibility of the front, it must be investigated whether parcels possibly present in front of the bottom edge found are higher than corresponds to the height of said bottom edge. This boils down to that it must be determined whether in the image there is a top of another parcel in front of, as well as above, the bottom edge of the parcel in question. For this purpose, there should preferably also be available (relative) depth information.

In order to be capable of determining the accessibility of the front of a parcel without complicated calculation methods, it is desirable to assume several things:

There are no obstructing objects outside the field of vision of the camera. For this purpose, there should only be defined, in an appropriate manner, the space within which parcels are permitted to be located ("work cell").

The parcels are rectangular. This means that all parcel surfaces are flat and rectangular in form.

All tops are horizontal surfaces.

The system should check whether the grab means are capable of removing the parcel without damaging other parcels. Since in the embodiment described one of the grab means approaches the parcel from the front and engages with it just above the bottom edge of the parcel, the area in front of and above the bottom edge of the parcel must be free from other objects. This is checked as follows by processing the images stored:

The bottom edge of the parcel had already been determined during earlier operations.

For each pixel between the bottom edge of the parcel and the small beam B, the height is estimated in a manner to be explained later.

If any point is higher than the bottom edge of the parcel, said parcel will not be capable of being processed by a grab means approaching from the front.

Determining the spatial position of an object point is not possible just like that, if only the corresponding image co-ordinates of said object point are known. After all, the image co-ordinates only determine the observation direction, as seen from the optical centre of the camera. The image co-ordinates define the virtual line between camera centre and object point, but it is not known where the object point is located on said line. For this purpose, there is required a third datum. This may be the datum that the object point is located in a certain surface. The object point then corresponds to the intersection of the line and the surface, and the associated object co-ordinates may thus be determined. Starting from the image points on the small reference beam B in an image column, and working upward in this image column, the object co-ordinates may be calculated as follows. Through calibration of the system, it is known in which plane the small reference beam is located. As a result, for each pixel of the small reference beam there may be calculated the corresponding world co-ordinates. This is also true for the limiting points of the small reference beam. A limiting point also is the intersection of the reference plane and a subsequent surface. The orientation of said surface is known: there is assumed an orderly stacking, so that the surfaces are either horizontal or vertical. The distinction between these follows from the intensity value in the third image, as described earlier. In the event of shadow points, the orientation of the surface follows from the lamp position and the shadow-casting edge. The lamp position is determined in advance. The shadow-casting edge is the limiting point just calculated. The surface is completely characterised by the limiting point and the surface orientation. This is to say that the world co-ordinates may be calculated for each pixel of said new surface as well. The same also holds for the limiting points of said new surface. Thus, for each pixel the corresponding spatial co-ordinates may be iteratively calculated. In practice, the assumption that the surfaces are purely horizontal or vertical is not completely met so that, upon practical application of the present method, there occurs a deviation which is greater as the stack becomes more chaotic. The inaccuracy need not be a drawback if the grab means is permitted to approach the object along the line from the camera in the direction of observation.

The parcel has now been detected, it has been determined that the one grab means is capable of approaching the parcel, and the position of the bottom edge has been determined. After the accessibility to the other grab means of the rear edge of the top has been determined, in a similar manner as described under "Re 3.", robotic grab may receive the instruction and information required to take the parcel from the stack.

It is noted here that the method need only result in finding one or two accessible parcels in the event of one-time application of the method. It is not necessary to obtain a total overview of the composition of the stack—to build up a complete model of the stack, as it were. It is sufficient if application of the method results in the possibility of one correctly chosen parcel being picked up from the stack. After said parcel has been removed, the method may then be applied once again to track down a next accessible parcel. Not waiting for a complete model of the stack being built up, but repeatedly using the method, results—even when using relatively simple computer means—in a sufficiently fast operation for parcel processing using robots.

I claim:

1. An apparatus for deriving spatial position information with respect to box-shaped objects which are stacked on top of and next to one another in a manner such that lateral surfaces of the objects in the stack are substantially parallel, said apparatus comprising:
    a camera for obtaining image information with respect to said objects, said camera being positioned at a first position obliquely above and in front of the stack such that an optical axis of the camera is located in a vertical plane which is substantially perpendicular to the lateral surfaces of the objects which, seen from the camera, are front surfaces of the objects, said optical axis making a first angle $\alpha$ with respect to a horizontal surface on which the stack rests;
    a first light source for emitting substantially bundled light in a direction at a second angle with respect to the horizontal surface on which the stack rests, said first light source being positioned at a second position and said second angle being greater than $\alpha$;
    a second light source for emitting substantially bundled light in a direction at a third angle with respect to the horizontal surface on which the stack rests, said second light source being positioned at a third position and said third angle being less than the second angle;
    a memory for storing intensity values of pixels representing said image information;
    a processor for performing mathematical operations on the intensity values stored in the memory to thereby derive the spatial position information.

2. The apparatus according to claim 1, wherein the first and second light sources are formed by one and the same light source which may be shifted, at appropriate points in time, from the second position to the third position, or from the third position to the second position.

3. The apparatus according to claim 1, wherein the first and second light sources are formed by one and the same light source whose light beam may be consecutively conducted, using mirrors, in two different directions, at either the second angle or the third angle with respect to the horizontal surface on which the stack rests.

4. The apparatus according to claim 1, wherein the first position at which the camera is located is a position at which the optical axis makes an angle of approximately 45 degrees with respect to the horizontal surface on which the stack rests, wherein the light from the first light source is bundled in a direction at an angle of 60 to 90 degrees with respect to the horizontal plane, wherein the light from the second light source is bundled in a direction at an angle of 0 to 30 degrees with respect to the horizontal plane, and wherein the camera and the first and second light sources are located in front of and above the stack.

5. The apparatus according to claim 1, wherein the first and second light sources are each located at a distance on a side of a vertical plane intersecting with the optical axis of the camera.

6. The apparatus according to claim 2, wherein the first position at which the camera is located is a position at which the optical axis makes an angle of approximately 45 degrees with respect to the horizontal surface on which the stack rests, wherein the light from the first light source is bundled in a direction at an angle of 60 to 90 degrees with respect to the horizontal plane, wherein the light from the second light source is bundled in a direction at an angle of 0 to 30 degrees with respect to the horizontal plane, and wherein the camera and the first and second light sources are located in front of and above the stack.

7. The apparatus according to claim 3, wherein the first position at which the camera is located is a position at which the optical axis makes an angle of approximately 45 degrees with respect to the horizontal surface on which the stack rests, wherein the light from the first light source is bundled in a direction at an angle of 60 to 90 degrees with respect to the horizontal plane, wherein the light from the second light source is bundled in a direction at an angle of 0 to 30 degrees with respect to the horizontal plane, and wherein the camera and the first and second light sources are located in front of and above the stack.

8. The apparatus according to claim 2, wherein the first and second light sources are each located at a distance on a side of a vertical plane intersecting with the optical axis of the camera.

9. The apparatus according to claim 3, wherein the first and second light sources are each located at a distance on a side of a vertical plane intersecting with the optical axis of the camera.

10. The apparatus according to claim 4, wherein the first and second light sources are each located at a distance on a side of a vertical plane intersecting with the optical axis of the camera.

11. A method for deriving spatial position information with respect to box-shaped objects which are stacked on top of and next to one another in a manner such that lateral surfaces of the objects in the stack are substantially parallel, said method comprising:

taking a first image of the stack of objects using a camera while the stack is illuminated by one of a first and second light source;

storing intensity values of pixels of the first image in a memory;

taking a second image of the stack of objects using the camera while the stack is illuminated by the other of the first and second light source;

storing intensity values of pixels of the second image in the memory; and comparing the intensity values of the pixels of the first image with the intensity values of the pixels of the second image to thereby derive the spatial positional information;

wherein said camera is positioned at a first position obliquely above and in front of the stack such that an optical axis of the camera is located in a vertical plane which is substantially perpendicular to the lateral surfaces of the objects which, seen from the camera, are front surfaces of the objects, said optical axis making a first angle α with respect to a horizontal surface on which the stack rests;

wherein said first light source emits substantially bundled light in a direction at a second angle with respect to the horizontal surface on which the stack rests, said first light source being positioned at a second position and said second angle being greater than α; and wherein said second light source emits substantially bundled light in a direction at a third angle with respect to the horizontal surface on which the stack rests, said second light source being positioned at a third position and said third angle being less than the second angle.

12. The method according to claim 11, wherein the step of comparing the intensity values of the pixels of the first image with the intensity values of the pixels of the second image comprises:

determining a ratio between the intensity values of pixels in the first image and the intensity values of corresponding pixels in the second image;

performing a mathematical operation on the ratios determined for all pixels in the first and second images;

storing in the memory a matrix of pixels for a virtual third image based on a result of the mathematical operation; and assigning to a pixel of the third image an intensity value which is representative of the result of the mathematical operation on the intensity ratio for said pixels in the first and second images which correspond to the pixel in the third image.

13. The method according to claim 12, wherein the mathematical operation comprises determining a value of arctan.

14. The method according to claim 12, further comprising:

determining, in the third image, lines which form boundaries between first and second areas, said first area including pixels having an intensity lying on or about a first value and corresponding to substantially horizontal surfaces of the objects, and said second areas including pixels having an intensity lying on or about a second value and corresponding to substantially vertical surfaces of the objects;

determining, starting from a first line which forms a boundary between a horizontal surface in the third image which is above a vertical surface, whether the vertical surface has a substantially rectangular shape, limited by the first line and three uninterrupted lines therebelow; and determining, starting from the first line, whether the horizontal surface has a substantially rectangular shape, limited by the first line and three uninterrupted lines thereabove.

15. The method according to claim 13, further comprising:

determining, in the third image, lines which form boundaries between first and second areas, said first area including pixels having an intensity lying on or about a first value and corresponding to substantially horizontal surfaces of the objects, and said second areas including pixels having an intensity lying on or about a second value and corresponding to substantially vertical surfaces of the objects;

determining, starting from a first line which forms a boundary between a horizontal surface in the third image which is above a vertical surface, whether the vertical surface has a substantially rectangular shape, limited by the first line and three uninterrupted lines therebelow; and determining, starting from the first line, whether the horizontal surface has a substantially rectangular shape, limited by the first line and three uninterrupted lines thereabove.

* * * * *